Sept. 13, 1966  J. D. SUTHERLAND, JR., ETAL  3,272,768
METHOD OF COAGULATING RUBBERY POLYMER LATICES
Filed July 10, 1963                                    3 Sheets-Sheet 1

FIG. 1a.

INVENTORS.
JOHN D. SUTHERLAND, JR.
KJETIL GAUSLAA
ROBERT A. GERLICHER
BY Shanley & O'Neil
ATTORNEY

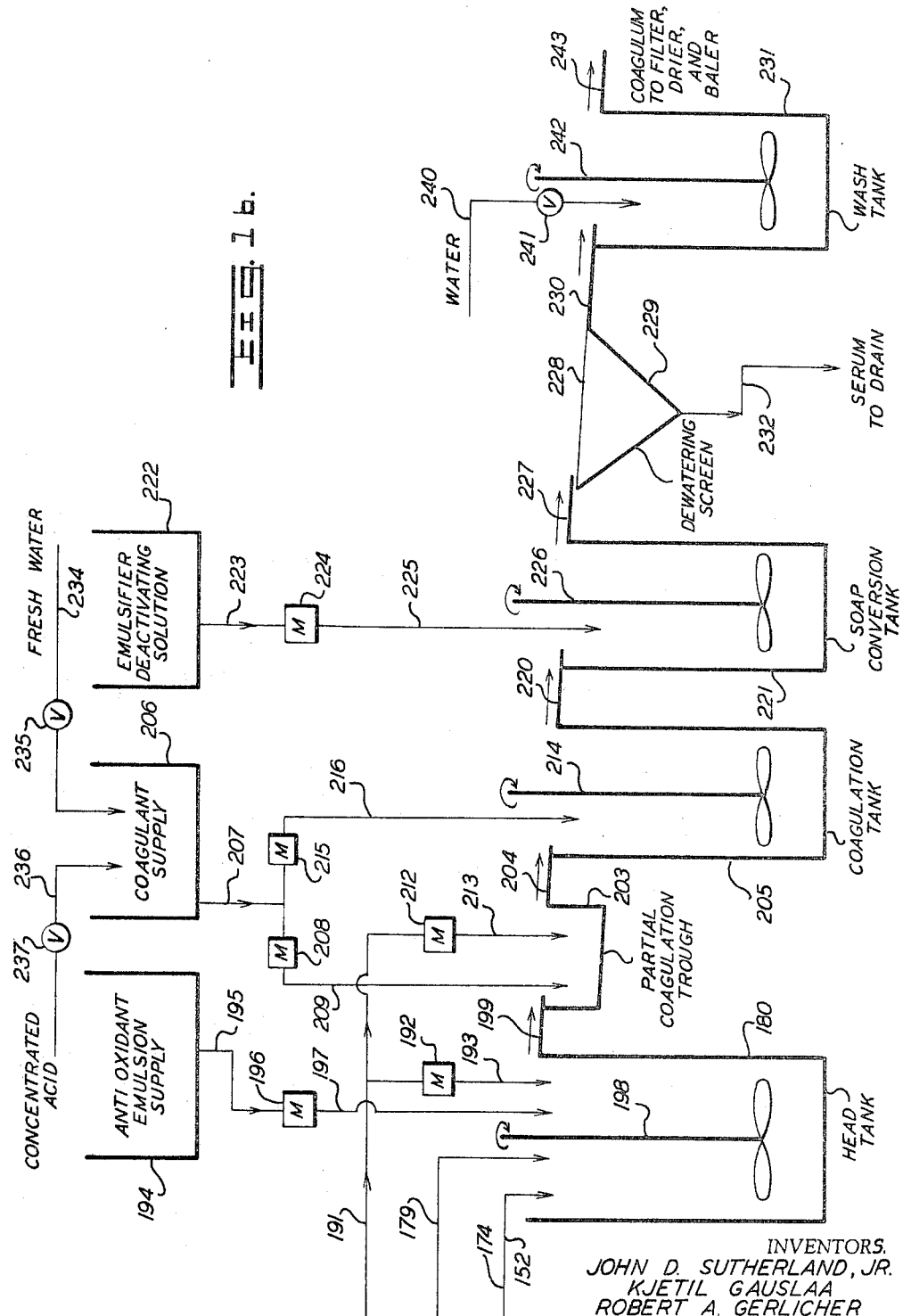

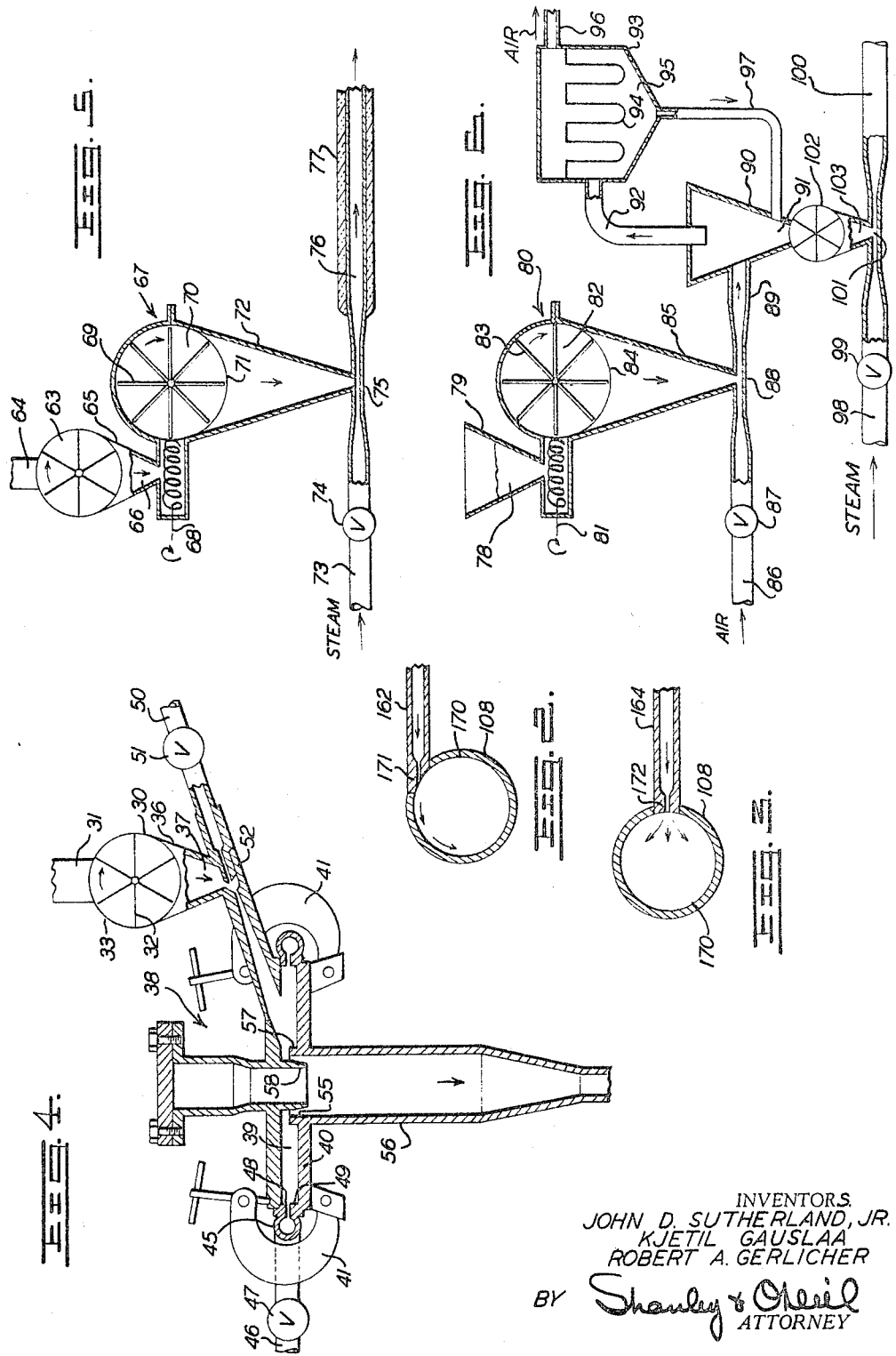

United States Patent Office

3,272,768
Patented Sept. 13, 1966

3,272,768
METHOD OF COAGULATING RUBBERY POLYMER LATICES
John D. Sutherland, Jr., Baton Rouge, La., Kjetil Gauslaa, Sarpsborg, Norway, and Robert A. Gerlicher, Baton Rouge, La., assignors to Copolymer Rubber and Chemical Corporation, a corporation of Louisiana
Filed July 10, 1963, Ser. No. 295,285
19 Claims. (Cl. 260—27)

This application is a continuation-in-part of our co-pending application Serial No. 783,802, filed December 30, 1958, for Preparation of Rubbery Polymers and Product, now abandoned.

This invention relates to the preparation of rubbery polymers and, more particularly, to the preparation of rubbery polymers containing dispersed pigments and/or reinforcing agents. In some of its more specific aspects, the invention further relates to a method of preparing rubbery polymer black masterbatches or oil-black masterbatches whereby crumb size may be increased substantially over that obtainable by the usual prior art methods of coagulation.

It has long been known that incorporation of colloidal carbons generally referred to in the art as carbon black with rubbery polymers imparts desirable properties in the ultimate product such as increased modulous, tensile strength and abrasion resistance. While carbon black is widely used as a reinforcing agent for rubbery polymers and is very satisfactory for this purpose once properly incorporated therewith, the prior art methods available heretofore have left much to be desired.

The method most widely used at present for incorporating carbon black with rubbery polymers involves vigorous milling of dry pelletized carbon black into a solid rubbery polymer to be reinforced therewith over an extended period of time. The labor and power requirements for milling dry pelletized carbon black into solid rubbery polymers are excessive and also it is often difficult to obtain a uniform dispersion of sufficiently finely divided particles of carbon black. This tends to deleteriously affect the ultimate product since, for best results, it is essential that the carbon black be uniformly dispersed in finely divided form throughout the solid rubbery polymer. In addition, the working conditions are very undesirable since the light, dry particles of carbon black are extremely difficult to restrict to the working area and invariably the milling equipment and even the entire plant in the vicinity of the milling operation are soon covered with a sooty film of carbon black.

As a result of the above mentioned and other disadvantages of the available methods for milling dry carbon black into solid rubbery polymers, still other methods have ben proposed. One such method includes mixing an aqueous suspension of carbon black with rubbery polymers which are in the form of latex, and then coagulating the mixture of latex and aqueous suspension of carbon black to produce coagulum having carbon black dispersed therein in finely divided form. This method, i.e., black masterbatching or oil-black masterbatching, requires that the carbon black be added to the latex in the form of an aqueous slurry with the carbon black being in an extremely finely divided condition. Since the aqueous slurry of wetter carbon black is easily handled and readily restricted to the working area and, upon coagulation of the mixture, the resulting coagulum already contains finely divided carbon black dispersed therein, the carbon black handling problem and extensive milling requirement characteristic of methods for incorporating dry pelletized carbon black with solid rubbery polymer are eliminated. However, when a mixture of latex and carbon black slurry, i.e., a carbex is coagulated by prior art practice to produce the desired rubbery polymer black masterbatch or oil-black masterbatch, the crumb size is extremely small with a prohibitive amount of fines being produced. Efforts to increase the crumb size, up until the time of the present invention, have not provided a generally acceptable method for the continuous coagulation of a carbex that is economic and completely eliminates fines.

Carbon black is commercially available in the form of pellets which are loose agglomerates of very small particles of carbon. This form of carbon black is commonly referred to in the art as pelletized carbon black. The loose agglomerates of carbon or "pellets" must be ground to a much more finely divided state, wetted and suspended in an aqueous medium prior to mixing with latex. This operation of comminuting the pelletized carbon black, wetting and suspending the carbon black in an aqueous medium has long been a serious problem in the preparation of carbon black masterbatches. However, since it is essential that the carbon black be added to the latex in the form of an aqueous suspension containing carbon black in extremely finely divided particles, the industry has continued to practice presently available unsatisfactory methods while awaiting the discovery of a more satisfactory method which eliminates the disadvantages of the prior art.

In accordance with current practice, aqueous suspensions of carbon black, i.e., carbon black slurries, are prepared by either dry grinding or wet grinding methods. In the dry grinding method, pelletized carbon black is first ground with a Mikro-pulverizer or a similar apparatus and the resulting comminuted carbon black dropped in the dry state into a large vat of water containing a dispersing and stabilizing agent such as Marasperce CB. The dispersing and stabilizing agent is essential since otherwise the dry carbon black would not be wetted in a practical period of time. With the addition of surface active agents, the carbon black slurry prepared by the dry grinding method is relatively stable and may be stored for considerable periods of time. For example, the carbon black slurry is prepared batchwise in very large quantity and stored in slurry tanks awaiting use. A determination of the solids content is made and then the slurry is metered into latex at a rate sufficient to give a desired carbon black content in the resultant solid rubbery polymer upon coagulation. This method has two major disadvantages insofar as quality of the product goes. One disadvantage is that the presence of the dispersing agent has a harmful effect on the bond between the carbon black and the resultant solid rubbery polymer. This interferes with the degree of reinforcement imparted to the rubber by the carbon black and results in lower tensile strength, poor abrasion resistance and a slower curing rate, among other things. Also, since it is necessary for practical reasons to prepare the slurry batchwise in large quantities and then store this slurry awaiting use, storage in the presence of water harms the carbon black in some manner and it is not as effective as a reinforcing agent. In addition, during storage the particles of carbon black have a tendency to settle out. Thus, the concentration of carbon black is constantly changing and the actual concentration at any given time may differ appreciably from the last determination of solids content. In view of this, it is almost impossible to obtain the exact desired quantity of carbon black in the rubber and it is extremely difficult to produce a uniform product.

The disadvantages of the prior art dry grinding process have resulted in considerable experimentation with wet grinding processes wherein the pelletized carbon black is mixed with water and then ground in the presence of water to thereby produce a slurry. In some instances, the surface active agent which is necessary in the dry grinding process above described may be omitted or the quantity reduced somewhat. In accordance with one wet grinding method, an experimental mechanical disperser is provided in the form of a pipe having a series of high-speed rotating knives arranged along the axis. A water-pelletized carbon black mixture is fed to the disperser with the high-speed rotating knives being depended upon to grind the pelletized carbon black and form a slurry without the use of dispersing and stabilizing agents. However, this process is not satisfactory since the power requirement necessary to give a suitable particle size is extremely high. In addition, the experimental unit cannot be scaled up to a size which is satisfactory for commercial operation and up until now the process remains a laboratory curiosity. For example, not more than one pound of carbon black per minute may be ground and the power requirement is 15 horsepower. In addition to the above-described apparatus, wet Mikro-pulverizers or Charlotte colloid mills have been used heretofore for grinding carbon black in the wet state, but these units require frequent expensive repairs in addition to being inefficient in operation. As a result of the disadvantages of the wet and dry grinding methods heretofore available to the industry, those skilled in the art have long sought a satisfactory method for grinding pelletized carbon black to a very finely divided particle size and then suspending the same in an aqueous medium.

When practicing the method of the present invention, the disadvantages of both the dry and wet grinding processes above described are overcome. For example, it is possible to continuously prepare an aqueous suspension of finely divided carbon black in an efficient manner without the need for a dispersing agent. Thus, the detrimental effects of the dispersing agent as well as its cost, the necessity for storing large quantities of carbon black slurry, and the disadvantages of the constantly changing solids content characteristic of the prior art dry grinding process are eliminated. Also, the carbon black may be continuously comminuted in a dry grinding operation, wetted and an aqueous suspension prepared at the rate it is being fed to a black masterbatching step. Since the dry pelletized carbon black may be readily metered, a constant carefully controlled amount of carbon black in the form of a slurry may be provided in this manner continuously. In addition, the extremely high power requirement, low output per unit and high upkeep cost characteristic of the wet grinding process above mentioned are eliminated. For example, as little as one-half horsepower per pound per minute of comminuted carbon black output is required and a fluid energy pulverizer or mechanical pulverizer of the hammer mill type may be used. This equipment is extremely sturdy, requires very little upkeep, and is capable of high output per unit.

In accordance with one important feature of the present invention, pelletized carbon black is ground to the desired particle size in the dry state and suspended in a gaseous medium including steam. Then, the gaseous suspension of comminuted carbon black is intimately contacted with an aqueous medium to condense the steam and produce an aqueous suspension of carbon black. The quenching of steam contained in the gaseous suspension of carbon black is preferably done under conditions whereby the loss of carbon black to the surroundings is substantially eliminated. Thus, the environment may be maintained in a clean condition thereby assuring greatly improved working conditions in the vicinity of the operation and much lower cleaning costs. The grinding and wetting of the comminuted carbon black by the method of the invention is more uniform and much faster than any satisfactory commercial method available heretofore and has the important further advantage of eliminating dispersing and stabilizing agents. In addition, it is possible to prepare continuously an aqueous suspension of comminuted carbon black at a predetermined constant rate and solids content, and then continuously supply the carbon black in the form of an aqueous suspension at a constant rate to the subsequent black or oil-black masterbatching operation of the invention. Thus, the present invention is capable of producing a greatly improved product due, in part, to the nature of the carbon black slurry alone since the dispersing and stabilizing agent is omitted, the carbon black need not be retained in contact with the aqueous medium for other than minimum periods of time, the carbon black may be in extremely finely divided particles as the dry grinding operation is more efficient in this respect and immediate use of the suspension does not allow sufficient time for agglomeration of the comminuted particles, and the absolute solids content of the suspension and the finished product may be controlled within closer limits than heretofore possible by any commercial method without the necessity for constantly determining solids content.

The method presently used in the industry for coagulation of rubbery polymer latices is illustrated and discussed on pages 201–204 of the text "Synthetic Rubber," G. S. Whitby, editor-in-chief, John Wiley and Sons, Incorporated, New York. In accordance with this method, serum from the dewatering screen is recycled back to the coagulation tank as the coagulant after adjustment of pH with concentrated acid. Thus, the concentrations of extraneous soluble constituents in the coagulant feed to the coagulation tank tend to build up and eventually the coagulant feed contains large amounts of water soluble substances such as salts which were present in the carbex feed, produced by chemical reactions taking place during coagulation, or added at some point in the system such as in a creaming step, the coagulation tank or soap conversion tank. For some reason, recycling serum back to the coagulation tank usually does not have an adverse effect upon coagulation of latex in the absence of dispersed pigments and/or reinforcing agents such as carbon black. However, when a black masterbatch or an oil-black masterbatch is prepared by coagulating carbex, the average crumb size produced under the same conditions as when coagulating latex alone is much smaller and a large proportion of undersized crumb and fines are produced. Further, the crumb size of masterbatches prepared in accordance with the prior art method could not be increased appreciably by adjustment of pH in the coagulation tank or by adjustment of other operating variables.

A large crumb size is very desirable in the physical processing of rubbery polymer coagulum since small crumb size material passes through filter screens employed for separating serum or wash water from coagulum and is lost in the plant effluent. Also, during drying of the crumb by means of conventional drier flights including perforated metal trays, a large proportion of the smaller particles and fines sift through the perforated trays and are lost in the drier. This allows fine particles of rubbery polymer to come into contact with the drier heating means and the rubbery polymer may be ignited and cause very serious drier fires which result in loss of product and extensive damage to equipment. Thus, it is essential that fines be removed from the drier at frequent intervals when processing fine crumb material and placed back in the drier trays by manual labor. This is a time consuming and expensive operation. As a result of the foregoing disadvantages, the art has long sought a satisfactory method for producing rubbery polymer masterbatches containing pigments and/or reinforcing agents such as black masterbatches or oil-black masterbatches, characterized by an increased crumb size that may be conveniently handled in presently used equipment.

While not limited thereto, the greatest difficulty with fines or undersized coagulum is experienced in the coagulation of latices containing dispersed pigment or reinforcing material. For example, in the coagulation of a carbex, i.e., a mixture of carbon black slurry and latex, to produce a rubbery polymer product containing carbon black dispersed therein, it is almost impossible by conventional methods of coagulation to prevent the formation of an uneconomic proportion of fines. While this problem has been long recognized in the coagulation of black masterbatches and oil-black masterbatches, as well as other pigment or reinforcing agent-masterbatches, a method has not been available heretofore that is satisfactory from the commercial standpoint and yet is capable of preventing the formation of fines and undersized particles of coagulum.

In accordance with one important variant of the present invention, pigment and/or reinforcing agent masterbatches of rubbery polymers may be prepared by a novel method which overcomes the many disadvantages of the conventional coagulation method. This may be conveniently accomplished by discarding the serum which heretofore has been recycled back to the coagulation tank and using only fresh coagulant containing substantially no recycled serum as the coagulant feed. In addition to using fresh coagulant substantially free of recycled serum, the method of the invention includes the steps of partially coagulating the rubbery polymer latex, dispersing a suitable tackifying agent such as rubbery polymer processing oil in the partially coagulated latex, and then further coagulating the latex. The method of the invention, regardless of the specific rubbery polymer latex or pigments or reinforcing agents employed, will result in an increase in crumb size. Thus, the principles of the present invention may be applied in suitable coagulation processes whenever it is desired to increase the particle size of rubbery polymer coagulum. However, the invention is especially advantageous when preparing masterbatches containing 100 parts by weight or more of pigmenting or reinforcing agent for each 100 parts by weight of the rubbery polymer.

When coagulating a carbex in accordance with the present invention, preferably soluble substances such as salts are not allowed to build up in the coagulation tank appreciably past their normal concentration in the coagulation mixture itself following addition of given amounts of fresh coagulant. Sodium or potassium salts which are produced upon addition of an acidic coagulant to latex containing sodium or potassium soaps, emulsifier deactivating substances such as Polyamine H, alum or glue, various water soluble salts which are present in the polymerization recipe such as electrolytes, and creaming agents such as brine, all have been found to have a detrimental effect upon the crumb size of black masterbatches when the serum is recycled in the system.

It is surprising that the above mentioned substances, which are normally present without adverse effect in recycled serum to latex coagulation processes, have the very detrimental effect of decreasing crumb size in methods for coagulating latex containing a dispersed pigment and/or reinforcing agent. Nevertheless, this has been discovered to be true. For example, in the conventional method for the coagulation of latex, not only is serum recycled in the system as discussed above, but a creaming agent such as brine is added prior to the coagulation step. However, in accordance with one important feature of the present invention, it has been discovered that latex may be creamed merely by addition of carbon black slurry and that brine solution or similar creaming agents are actually detrimental and should be omitted. Omitting the conventional creaming agent in addition to not recycling the serum in the system allows a further decrease in the concentration of salts present in the coagulation tank at the time of coagulating the carbex and it is possible to obtain an even larger crumb size. It is also surprising that dispersing even a relatively small amount of a tackifying agent in partially coagulated latex and further coagulating the latex in accordance with the invention results in a larger crumb size than may be obtained when the tackifying agent is omitted or when it is added prior to commencing coagulation. It is even more surprising that use, in accordance with the method of the invention, of fresh coagulant substantially free of recycled serum in combination with the steps of partially coagulating the latex, dispersing a tackifying agent in the partially coagulated latex and further coagulating the latex, results in an over-all method which entirely eliminates the problem of fines or undersized particles of coagulum in commercial scale operations, provides a coagulation method which is completely flexible, allows trouble free plant operation and, for the first time in the history of the industry, provides an economic, practical, commercial method for the coagulation of latex containing a dispersed pigment and/or reinforcing agent which is generally acceptable in all respects. The use of fresh coagulant together with addition of the tackifying agent to partially coagulated latex, as described herein, is the only practical combination of steps resulting in a relatively uncomplicated, commercial method providing all of the above mentioned advantages.

It is an object of the present invention to provide a novel method of coagulating rubbery polymer latices whereby the size of the resultant particles of rubbery polymer coagulum may be increased.

It is a further object of the present invention to provide a novel method of preparing rubbery polymers containing a dispersed pigment and/or reinforcing agent.

It is still a further object of the present invention to provide a novel method of preparing oil extended rubbery polymers containing a dispersed pigment and/or reinforcing agent.

It is still a further object of the present invention to provide a novel method of coagulating rubbery polymer latices containing dispersed therein at least 100 parts by weight of a pigment and/or reinforcing agent for each 100 parts by weight of rubbery polymer whereby the size of the resultant crumb may be increased over that obtainable by satisfactory prior art coagulation processes and the problem of fines eliminated.

It is still a further object of the present invention to provide a pigmented and/or reinforced rubbery polymer product containing at least 100 parts by weight of the pigment and/or reinforcing agent for each 100 parts by weight of the rubbery polymer that is prepared by the method of the invention and characterized by increased crumb size over that obtainable by satisfactory prior art coagulation processes and freedom from a substantial amount of fines.

It is still a further object of the present invention to provide a novel continuous method of coagulating rubbery polymer latices containing dispersed therein at least 100 parts by weight of a pigment and/or reinforcing agent for each 100 parts by weight of rubbery polymer by further coagulation of partially coagulated latex in the presence of a tackifying agent whereby the size of the resultant crumb may be increased over that obtainable by satisfactory prior art coagulation processes.

It is still a further object of the present invention to provide a novel continuous method of preparing black masterbatches or oil-black masterbatches containing at least 100 parts by weight of carbon black for each 100 parts by weight of rubbery polymer and the novel product thus prepared.

Still other objects of the present invention and the attendant advantages thereof will be apparent to those skilled in the art upon reference to the following detailed description, the example, and the drawings, wherein:

FIGURES 1–a and 1–b illustrate a presently preferred arrangement of apparatus for preparing an aqueous suspension of carbon black and a black masterbatch therefrom in accordance with the present invention;

FIGURE 2 is a diagrammatic cross-sectional view taken through the quenching tower along the line 2—2 of FIGURE 1–a;

FIGURE 3 is a diagrammatic cross-sectional view taken through the quenching tower along the line 3—3 of FIGURE 1–a;

FIGURE 4 is a diagrammatic cross-sectional view of a fluid energy pulverizer suitable for dry grinding pelletized carbon black in accordance with the present invention;

FIGURE 5 is a diagrammatic cross-sectional view of a mechanical pulverizer suitable for grinding dry pelletized carbon black in accordance with the present invention and illustrating a method of suspending the resulting comminuted carbon black in steam upon passing from the mechanical pulverizer; and FIGURE 6 is a diagrammatic cross-sectional view taken through a mechanical pulverizer suitable for grinding dry pelletized carbon black in accordance with the present invention and illustrating a method of suspending the comminuted carbon black first in air for the purpose of conveying the same in the dry state over a desired distance, followed by separation of a large proportion of the air with a cyclone separator and bag-type dust collector and subseqeunt suspension of the dry comminuted carbon black in steam prior to wetting.

Referring now to FIGURE 1–a of the drawings, dry pelletized carbon black 10 in storage bin 11 may be metered and fed at a constant predetermined controlled rate by means of carbon black feeder 12 via chute 14 to air lock 15. The carbon black feeder 12 may be a continuous loss in weight type feeder such as an "Omega feeder" or any suitable gravimetric feeder designed to deliver a constant carefully controlled output of carbon black. The air lock 15 may be a roto-lock valve or a star feeder, and is designed to prevent the direct pulling of air into the carbon black grinder to be described hereinafter, although air present in the light, dry, voluminous pellets of carbon black may be present in the feed. While it is not usually preferred practice, air lock 15 may be eliminated in most instances and the carbon black passed directly to the carbon black grinder.

The metered dry pelletized carbon black may be continuously passed at a predetermined controlled rate to dry carbon black grinder 16 via chute 17 where the loosely agglomerated particles of carbon are ground to a desired finely comminuted form. The grinder 16 may be of any suitable prior art design and construction, as will be explained more fully hereinafter. However, grinders of the type commonly referred to in the art as fluid energy pulverizers or mechanical pulverizers for dry pelletized carbon black are generally satisfactory and may be used. The carbon black may be suspended in steam during the dry grinding operation, or the resulting comminuted carbon black may be withdrawn from grinder 16 via conduit 18 and then suspended in steam. For example, steam may be fed to grinder 16 via conduit 19 and conduit 20 including open control valve 21, with control valve 22 in conduit 23 being closed, and the carbon black suspended in steam during the grinding operation; or the dry comminuted carbon black may be withdrawn from grinder 16 via conduit 18 and then suspended in steam supplied via conduits 19 and 23 including open control valve 22, with control valve 21 in conduit 20 being closed. The point where the conduits 18 and 23 join may be constructed in the form of a venturi passage 24 to insure continuous removal of comminuted carbon black from carbon black grinder 16 via conduit 18 and suspension of comminuted carbon black in steam. A suspension of comminuted carbon black in a gaseous medium including steam continuously flows through conduit 25 at substantially the rate the pelletized carbon black is being ground in grinder 16, which in turn is dependent upon the predetermined controlled rate at which the dry pelletized carbon black is fed to grinder 16.

Referring now to FIGURE 4 of the drawings, which illustrates a dry carbon black grinder in the form of a fluid energy pulverizer wherein steam under pressure is used for injection of the pelletized carbon black and also as the fluid providing energy for the grinding operation, metered dry pelletized carbon black from a feeder such as carbon black feeder 12 is passed to roto-lock valve 30 via chute 31. The rotor-lock valve 30 is a prior art type of air lock readily available and includes rotating segments 32 in sealing engagement with cylinder 33. As the segments 32 rotate in the direction of the arrow, the segment on top communicating with chute 31 is filled with carbon black while the segments on the sides are in sealing engagement with cylinder 32 thereby preventing the direct pulling in of air through roto-lock valve 30. When the filled segment reaches the bottom, the carbon black contents are poured into feed funnel 36 thereby forming a body of pelletized carbon black at 37.

The fluid energy pulverizer generally designated as 38 may be the type described under "Jet Pulverizers" in Perry's Chemical Engineering Handbook, the type disclosed in U.S. Patent 2,590,220, or other suitable prior art types suitable for grinding pelletized carbon black or other loosely agglomerated particles of carbon.

The pulverizer 38 includes a chamber 39 formed by a pair of spaced circular plates 40 which are clamped together by clamping means 41. High pressure steam is fed to a header 45 via conduit 46 at a rate controlled by valve 47 and then into chamber 39 through tangential jets or orifices 48 formed in wall 49. Pelletized carbon black 37 in feed funnel 36 is fed into chamber 39 by means of steam under pressure which is flowing through conduit 50 at a rate controlled by valve 51. The conduit 50 is provided with a venturi passage 52 which assures proper withdrawal of carbon black 37 from feed funnel 36 and its suspension in steam. An outlet 55 is provided in the vicinity of the center of chamber 39 which leads into conduit 56. A dam 57 is provided on the bottom of chamber 39 immediately adjacent the outlet 55 and with a hollow annular member 58 of a diameter somewhat smaller than the conduit 56 being inserted thereinto thereby reducing the cross-sectional area providing for communication between conduit 56 and chamber 39.

The steam fed through conduits 46 and 50 may be at any suitable pressure such as about 20–200 p.s.i.g., but in most instances preferably about 50 p.s.i.g. in conduit 46 and 125 p.s.i.g. in conduit 50. Obviously, there is a pressure drop in chamber 39, which may be approximately 5–15 p.s.i.g. or higher in some instances. The pelletized carbon black 37 may be fed into the fluid energy pulverizer 38 at a feed rate of about 1–80 pounds per minute, but preferably about 30 pounds per minute in most instances. Also, it is desired to have a ratio by weight between the feed rates of steam and carbon black of approximately 0.5:1 and 12:1, but usually preferably about 1:1, depending somewhat upon the rate of pelletized carbon black feed and the desired particle size in the comminuted carbon black. It is essential that the steam not be allowed to condense while within the fluid energy pulverizer 38 and apparatus associated therewith to a sufficient extent to cause the carbon black to become moist and ball up or otherwise plug the apparatus. Condensation of steam may be readily prevented by supplying super-heated steam at about 250–900° F., but preferably about 450° F. in most instances. However, since it is only essential to prevent condensation of sufficient steam within the apparatus to cause plugging due to wetting of the carbon black, it may be possible in some instances to use saturated steam. It also may be possible to provide heating means for the apparatus to prevent condensation of steam or to remove water entering with saturated steam.

High pressure steam is injected into fluid energy pulverizer 38 to grind the pelletized carbon black by centrifugal action in the circular chamber 38. At the same time, the carbon black is suspended in steam or a gaseous medium including steam at the time of introduction into the aqueous medium, the need for a wetting agent is eliminated. Thus, in operating the fluid energy pulverizer 38, dry pelletized carbon black 37 is withdrawn from feed funnel 36 by means of steam passing through venturi passage 52 in conduit 50 and the resulting steam suspension passed into chamber 39 at high velocity. Then, the high pressure steam fed into chamber 39 via tangential steam jets 48 impart an extremely rapid, swirling motion to the carbon black pellets. As a result of the collision of the carbon black particles with one another and the surfaces of the chamber 39, the carbon black pellets are ground to as fine a particle size as may be desired. The finely ground material overflows dam 57 and escapes through outlet 55 into conduit 56 in the form of a gaseous suspension of comminuted carbon black. The preferred particle size in the comminuted carbon black will vary depending upon the nature of the desired reinforced rubbery polymer product, but preferably not more than about 2% of the comminuted carbon particles should be retained on a 325 mesh screen. However, much smaller particle sizes may be present and are preferred since the smaller the particle size, the better the results.

The pelletized carbon black feed may be of a type commonly employed in the rubber industry and the pellets are usually of such a size as will pass a 12 mesh screen. However, the term "pelletized carbon black" is broadly used in the specification and claims and intended to include carbon black which is termed pelletized in this industry, as well as other loosely agglomerated particles of carbon black regardless of their prior processing.

Referring now to FIGURE 5, metered dry pelletized carbon black from a carbon black feeder such as 12 illustrated in FIGURE 1–a is passed to roto-lock valve 63 via chute 64 and deposited in feed funnel 65 as shown at 66. The roto-lock valve 63 is not essential since the screw feeder 68 may be designed and constructed so as to also perform the function of an air lock. However, when present as illustrated in FIGURE 5, the roto-lock valve 63 may be similar in construction and operation to the roto-lock valve 30 described above in connection with FIGURE 4. The carbon black is continuously fed to mechanical pulverizer 67 by means of screw feeder 68. The mechanical pulverizer 67 is provided with a plurality of rapidly rotating hammers 69 which are driven in the direction of the arrows. The carbon black fed to chamber 70 is ground by rapidly rotating hammers 69 to a particle size sufficiently small to pass through classifying screen 71. The classifying screen 71 is selected so as to assure a sufficiently small particle size in the resulting comminuted carbon black. After passing through classifying screen 71, the comminuted carbon black falls into funnel 72. High pressure steam is fed via conduit 73 at a rate controlled by valve 74 to venturi passage 75 for the purpose of withdrawing comminuted carbon black from funnel 72 and suspending the same in steam. Since a small amount of air is usually present in the carbon black feed passing through roto-lock valve 63, the gaseous suspension of carbon black will contain a major proportion of steam and a minor proportion of air. In this manner, a constant flow of comminuted carbon black suspended in a gaseous medium including steam flows through conduit 76 to a quenching step to be described hereinafter. The steam feed through conduit 73 may be superheated to a temperature of 250–900° F. However, saturated steam may be used in instances where there is insufficient condensation or moisture to cause plugging of the equipment with moist carbon black or where steps are taken to prevent condensation such as by heating all steam carrying equipment to an elevated temperature substantially above the boiling point of water. Also, insulation 77 may be provided to reduce loss of heat and the amount of condensation.

Referring now to FIGURE 6 of the drawings, metered dry pelletized carbon black at 78 may be fed to feed funnel 79 by a carbon black feeder such as 12 illustrated in FIGURE 1–a. The carbon black at 78 is then fed to mechanical pulverizer 80 by means of screw feeder 81. The mechanical pulverizer 80 is provided with a chamber 82 housing hammers 83 which are rapidly driven in the direction of the arrow. The mechanical pulverizer 80 may operate in the manner described in connection with that of FIGURE 5, i.e., the carbon black is pulverized by mechanical action of hammers 83 to a desired particle size and passed through classifying screen 84 into funnel 85. The comminuted carbon black is then suspended in air supplied via conduit 86 at a rate controlled by valve 87. To facilitate withdrawal of comminuted carbon black from funnel 85 and its suspension in air, the conduit 86 is provided with venturi passage 88. The suspension of comminuted carbon black in air flowing in conduit 89 may be transferred over long distances without danger of wetting due to condensation of the gaseous suspending medium. The gaseous suspension then may be passed to a cyclone separator 90 where most of the comminuted carbon black separates at 91 and air containing some suspended carbon black is withdrawn via conduit 92 and passed to bag type dust collector 93. The remaining suspended carbon black is filtered from the air by bag-like filter members 94 with the carbon black being removed therefrom and collected at 95 and air free of carbon black being withdrawn from dust collector 93 via conduit 96. For the purpose of increasing the rate of flow through dust collector 93, a substantial difference between the pressures on the entrance and exit sides of filter members 94 may be maintained. This may be acomplished by maintaining a superatmospheric pressure in conduit 92 and substantially atmospheric pressure in conduit 96, or by maintaining substantially atmospheric pressure in conduit 92 and a subatmospheric pressure in conduit 96. The carbon black at 95 is withdrawn via conduit 97 and passed to cyclone separator 90 where it is mixed with carbon black collecting at 91. The carbon black at 91 is withdrawn from cyclone separator 90, passed through air lock 102 to funnel 103, and suspended in steam supplied via conduit 98 at a rate controlled by valve 99 to provide a suspension of comminuted carbon black in steam flowing in conduit 100. To facilitate withdrawal of carbon black and its suspension in steam, a venturi passage 101 may be provided. The gaseous suspension of carbon black in steam flowing in conduit 100, the suspension usually containing some air that was withdrawn from cyclone separator 90 along with the carbon black, is then passed to a quenching step for the preparation of an aqueous suspension of carbon black.

The suspension of comminuted carbon black in a gaseous medium including steam, whether prepared by the methods of FIGURES 4, 5 or 6, is subsequently passed to a quenching step where the comminuted carbon black is wetted and an aqueous suspension thereof prepared by condensing the steam with an aqueous medium. Referring again to FIGURE 1–a, the gaseous suspension of carbon black flowing in conduit 25 is passed to header 105 and, depending upon the positions of control valves 106 and 107, it may be passed into quenching tower 108 via conduit 109 at a point above liquid level 110, or it may be passed via conduit 111 and introduced at a point below the liquid level 110 to also obtain vigorous agitation of the collected body 112 of aqueous suspension of carbon black in addition to quenching of the steam. If desired, the control valves 106 and 107 each may be cracked and a first portion of the gaseous suspension of carbon black passed via conduit 109 and a second portion passed via conduit 111. This latter procedure will allow partial quenching of the gaseous suspension in aqueous suspension of carbon black 112 with a accompanying agitation and heating thereof and partial condensation in the space above liquid level 110 by intimate contact with sprayed aqueous medium as will be explained more fully hereinafter.

The gaseous suspension of carbon black introduced above liquid level 110 via conduit 109, as well as any gaseous suspension introduced via conduit 111 and escaping upward through aqueous suspension 112, is quenched in the gaseous phase above liquid level 110 by means of sprayed aqueous medium. The aqueous medium may be nitroduced via conduit 116 and, after careful metering by meter 117, passed at a predetermined controlled rate via header 118 and conduits 119, 120 and 121 including control valves 122, 123 and 124, respectively, to spray devices 125, 126 and 127, respectively. The spray devices 125, 126 and 127, as well as spray device 128 to be described more fully hereinafter, may be prior art spray devices of a type designed to produce a spray of finely divided aqueous medium, preferably in relatively finely divided form, which falls downwardly through quenching tower 108. For example, the spray devices may be of a type comprising a nozzle provided with a plurality of small openings through which aqueous medium under pressure is projected and subdivided into droplets, or they may be of the type which includes a rapidly rotating member to which aqueous medium is supplied and thrown outwardly by centrifugal force to thereby subdivide the aqueous medium into droplets. The header 118 is also in communication with conduit 129 including control valve 130 for the purpose of supplying fresh aqueous medium to conduit 131, as will be described more fully hereinafter.

As previously described, usually some gases that are not condensable upon contact with aqueous medium are present in the gaseous suspension of carbon black fed to quenching tower 108. These non-condensable gases, whether air or other non-condensable gases, are almost impossible to eliminate entirely. If the gaseous suspension of carbon black in steam flowing in conduit 25 contains a substantial proportion of air and it is introduced via conduit 111 beneath the liquid level 110, then the gases which are not condensed in the aqueous suspension of carbon black 112 tend to rise upwardly therein and form a froth on the surface which is very undesirable. Thus, in instances where a large amount of air is present, it is preferred that the gaseous suspension of carbon black be fed via conduit 109, introduced at a point above liquid level 110 and then quenched in the gaseous phase by means of sprayed aqueous medium. This procedure allows the non-condensable gases to escape upwardly through tower 108 without at any time being entrapped within a body of aqueous medium and yet the steam content of the gaseous suspension is readily condensed. Often small amounts of air or other non-condensable gases may be dissolved in the aqueous medium and, where their original content is very low, it is sometimes possible to completely dissolve the non-condensable gases in a body of the aqueous medium and the difficulty due to froth formation is avoided. Any air or other non-condensable gases passing upwardly through quenching tower 108 tend to carry some comminuted carbon black and for this reason a series of vertically arranged sprays is provided. Although the amount of carbon black lost from this source may be very small on a daily basis, nevertheless it is very undesirable since the surrounding area eventually is covered with a layer of carbon black. Thus, while the loss of carbon black itself is unimportant, the resulting unpleasant working conditions and the upkeep necessary over the entire plant area are prohibitive. In accordance with the present invention it is possible to substantially eliminate the loss of carbon black from quenching tower 108 by providing a plurality of vertically arranged spray devices 125, 126, 127 and 128 and demisters 135 and 136 which assure intimate contact between the upwardly rising uncondensed gases and the aqueous medium. The spray devices 125 and 126 are positioned above demisters 136 and 135, respectively, for the purpose of supplying aqueous medium to wet the demisters and wash carbon black therefrom downwardly through quenching tower 108. By the time the non-condensable gases reach outlet 137, they are washed substantially free of carbon black and are then passed to the atmosphere via outlet conduit 138.

In accordance with one important embodiment of the present invention, it has been discovered that when comminuted carbon black is suspended in a gaseous medium, including steam and the steam content quenched with an aqueous medium, then the steam has a very remarkable wetting property which results in the comminuted carbon black being wetted immediately and suspended in the aqueous medium without the necessity for a wetting agent. While the gaseous suspension may be quenched by direct injection into a body of the aqueous medium, it is usually preferred that the condensation be by means of sprayed aqueous medium falling through the gaseous suspension. However, if desired, other methods of quenching may be used. For example, aqueous medium in the form of fresh water and/or dilute latex supplied via conduits 116, 118 and 129, or aqueous suspension of carbon black supplied via conduit 142, or mixtures thereof in any proportions, may be fed via conduit 131 to header 143 including control valves 144 and 145. Also, the aqueous medium flowing in conduit 131 may be fed via conduit 146 to spray device 128 upon opening control valve 147 and closing control valves 144 and 145. Upon opening control valve 144 and closing control valves 145 and 147, the aqueous medium flowing in conduit 131 may be passed via conduit 148 and injected or sprayed directly into the gaseous suspension of carbon black flowing in conduit 109 to condense or partially condense the steam content before discharging the remainder into quenching tower 108 at a point above liquid level 110. In such event, especially when gas-liquid contact means are provided within quenching tower 108 in the vicinity of the point of entry of conduit 109 and below, the air or other non-condensable gases entrapped in the aqueous medium will have a chance to pass upwardly in quenching tower 108. Similarly, upon closing control valves 144 and 147, the aqueous medium flowing in conduit 131 may be passed via conduit 149 and injected or sprayed directly into the gaseous suspension of carbon black flowing in conduit 111 to thereby condense or partially condense the steam content before it is passed to quenching tower 108.

The aqueous suspension of carbon black 112 collecting in the bottom of quenching tower 108 is withdrawn via conduit 150 and forced by means of pump 151 through conduit 152 including liquid level control valve 153. The liquid level control valve 153 is operated by liquid level controller 156 which is operatively connected in a conventional manner with level sensitive means 157 and liquid level control valve 153 by means of connections 158 and 159, respectively. The liquid level controller 156 operates valve 153 in response to changes in the height of liquid level 110 to thereby maintain the same within predetermined limits by by-passing a portion of the aqueous suspension of carbon black withdrawn via conduit 150 via conduit 160 to header 161. Header 161 is in communication with conduits 162, 163, 164 and 142 which include control valves 165, 166, 167 and 168, respectively, and lead back to quenching tower 108. Inasmuch as the liquid level 110 is maintained within predetermined limits by the above means, it will be apparent that the volume of liquid flowing in conduit 152 at point 169 will be at the rate the aqueous medium and water resulting from condensation of the steam are supplied to tower 108 and this volume of aqueous medium will contain suspended comminuted carbon black in an amount equal to the rate determined limits by by-passing a portion of the aqueous of feed to grinder 16. Also, the weight of carbon black flowing through conduit 152 at point 169 at any given time, in continuous operation, will be equal to the rate of feed of carbon black by carbon black feeder 12. Thus, a convenient means is provided for continuously supplying a given quantity of comminuted carbon black in the form of an aqueous suspension which does not contain a dispersing or stabilizing agent and wherein the carbon black content may be controlled within very narrow limits. Preferably, 1–10% by weight carbon black slurry is prepared in quenching tower 108 by feeding thereto via conduit 118 20–200 gallons per minute of aqueous medium when the steam suspension of carbon black feed is within the limits mentioned hereinbefore. For best results in most applications, it is preferred that a 6% slurry be prepared. The temperature of the collecting slurry may be maintained at 130–210° F. for example, or any suitable temperature but preferably at 185° F. The pressure in the quenching tank may be about 10 inches of mercury vacuum to 2 p.s.i.g., but preferably about 1 p.s.i.g.

The capacity of pump 151 may be such as to provide for the pumping of aqueous suspension of carbon black at a rate substantially higher than that flowing in conduit 152 at point 169, thereby assuring recycle at a substantial rate via conduit 160. In this manner, it is possible to provide a feed of aqueous suspension of carbon black in conduits 162, 163 and 164 for injection into the body of aqueous suspension 112 for purposes of agitation and/or in conduit 142 for the purpose of quenching the gaseous suspension of carbon black. Recycling carbon black suspension via conduit 142 assures that sufficient aqueous medium will always be present for quenching the steam with the necessity for fresh water or latex being held to a minimum. This arrangement allows the concentration of the aqueous suspension to be increased to any desired practical level. Conduits 162, 163 and 164 may be constructed so as to assure a maximum amount of agitation within aqueous suspension 112 and prevent carbon black from settling out. Also, since aqueous suspensions of carbon black tend to be thixotropic, this arrangement allows the highest possible concentration of carbon black to be reached for a given fluidity. With reference to FIGURE 2 of the drawings, the conduit 162 is shown passing tangentially through wall 170 of quenching tower 108 and in such a manner as to impart a swirling motion to the body of aqueous suspension 112. Also, the conduit 162 may contain a restricted portion 171 to further increase this effect. Similarly, upon reference to FIGURE 3 of the drawings, the conduit 164 is shown passing perpendicularly through wall 170 of quenching tower 108 and in such a manner as to insure agitation of the body of aqueous suspension 112 but not necessarily with a swirling motion. The conduit 164 may be provided with a restricted portion 172 which further increases this agitation effect. It will be apparent that any or all of the conduits 162, 163 and 164 may pass through wall 170 of quenching tower 108 tangentially as described in FIGURE 2 or perpendicularly as described in FIGURE 3.

Referring now to FIGURE 1–b of the drawings, rubbery polymer latex contained in latex supply tank 175 may be withdrawn via conduit 176 and passed at a predetermined rate controlled by meter 177 via conduit 179 to head tank 180. Carbon black slurry flowing in conduit 152 at point 174 is passed to head tank 180 at a predetermined desired rate and preferably at the rate it is being prepared. In addition, rubbery polymer processing oil emulsion contained in tank 190 may be withdrawn via conduit 191 and passed at a predetermined rate controlled by meter 192 via conduit 193 to head tank 180; while antioxidant emulsion contained in tank 194 may be withdrawn via conduit 195 and passed at a predetermined rate controlled by meter 196 via conduit 197 to head tank 180. The various ingredients fed to head tank 180 may be agitated and thoroughly mixed by agitation means including driven stirrer 198 and may overflow via spout 199 in the form of a more or less homogeneous mixture. In the event it is not desired to prepare an oil-extended rubbery polymer product having a high oil content, the oil emulsion feed to head tank 180 may be eliminated as well as the anti-oxidant emulsion where it is not desired.

The carbex passes from spout 199 into partial coagulation trough 203 and, after passing therethrough, overflows via spout 204 into coagulation tank 205. Coagulant contained in coagulant supply tank 206 may be fed via conduits 207 and 209 at a predetermined rate controlled by meter 208 into a portion of the partial coagulation trough 203 near the carbex entry side, i.e., near spout 199. The rate of feed of the coagulant is such as to partially coagulate the latex and assure the formation of small particles of coagulum which may be approximately the size of grains of sand. However, somewhat smaller and much larger particles of coagulum may be formed at this point. The amount of coagulum formed will depend somewhat upon the amount of coagulant introduced at this point. Satisfactory results have been obtained by coagulating either a major or minor proportion of the latex, and preferably about 5–80% by weight of the rubbery polymer content of the latex should be coagulated at this point. For best results, usually about 20–40% by weight of the rubbery polymer should be coagulated during the partial coagulation step.

The preferred coagulant for most rubbery polymer latices is fresh dilute aqueous mineral acid having a pH of about 1.0–2.5, and preferably about 1.7. While any suitable mineral acid such as sulfuric acid, hydrochloric acid, phosphoric acid, etc., may be used, usually dilute sulfuric acid is the preferred mineral acid. However, as will be recognized by those skilled in the art, other coagulants including organic acids such as acetic acid may be used at this point to partially coagulate the latex and produce particles of coagulum having a size about that of grains of sand or larger. The coagulant may be carbonic acid in some instances and, in such event, preferably carbon dioxide is added directly to the latex under super-atmospheric pressure and at elevated temperature to assure faster partial coagulation. The desired degree of partial coagulation may be controlled by visual observation or by controlling the pH of the latex-containing mixture overflowing spout 204. For example, when coagulating a carbex, the coagulant may be added in sufficient quantity to form particles of coagulum in the mixture overflowing spout 204, with the mixture having the appearance of black grains of sand floating in a grayish serum containing a considerable amount of latex. In the event the partial coagulation in trough 203 is controlled by pH, then a pH of about 4.0–6.5 is usually satisfactory in most intances. However, for best results usually a pH of about 5.0–5.5 is preferred.

In accordance with one important feature of the present invention, rubbery polymer processing oil is added to the partially coagulated latex and preferably to the partial coagulation trough 203 at a point between the coagulant feed and the overflow spout 204. Preferably, the coagulant is added to the trough 203 at a point almost immediately after entry of the carbex, while the oil emulsion may be fed via conduit 213 at a predetermined rate controlled by meter 212 to a point approximately midway or somewhat past midway of the trough 203. It is not always essential that oil be supplied to the head tank, but it is essential that oil be dispersed in the partially coagulated latex to be further coagulated.

The partially coagulated latex overflowing spout 204 may be agitated in coagulation tank 205 by agitation means including driven stirrer 214. Additional coagulant contained in coagulant supply tank 206 may be withdrawn via conduit 207 at a predetermined rate controlled by meter 215 and fed to coagulation tank 205 via conduit 216. This coagulant may be fresh dilute mineral acid as described above, fresh concentrated mineral acid, or other suitable coagulants as defined herein. For example, carbonic acid often may be used as the coagulant in partial coagulation trough 203 followed by fresh dilute mineral acid in coagulation tank 205. In most instances, the preferred coagulant for addition to coagulation tank 205 is dilute mineral acid of a strength as described above for addition to trough 203, and it should be added in sufficient quantity to assure substantially complete coagulation of the latex. Usually, the contents of coagulation tank 205 should be maintained at a pH of about 1.7–5.0, and for preferred results at a pH of about 3.0. When the coagulant is added in this amount, the serum overflowing spout 220 is milky white in color but contains very little uncoagulated latex.

The agitated mixture of crumb and serum overflows spout 220 into soap conversion tank 221. A suitable prior art secondary emulsifier deactivating solution such as diethylene triamine contained in supply tank 222 is withdrawn via line 223 at a predetermined rate controlled by meter 224 and fed to soap conversion tank 221 via conduit 225. The contents of soap conversion tank 221 are agitated by agitation means including driven stirrer 226 and thoroughly mixed.

The present invention allows a wide choice of substances suitable for deactivating the secondary emulsifier, and especially secondary emulsifiers usually present in synthetic rubbery polymerization recipes. For example, the emulsifier deactivator may be an aqueous solution of Polyamine H, which is said to be still bottoms obtained in the preparation of diethylene triamine and various other amine compounds, glue and other suitable prior art materials useful for this purpose. The addition of substances such as Polyamine H or glue at this point in the coagulation process is not detrimental since the crumb size has already been established. However, such substances should not be present in the coagulation tank itself. The preferred emulsifier deactivator is about 0.1–50% (by weight) aqueous Polyamine H solution which may be added to the material flowing through soap conversion tank 221 at a rate of about 1–10 gallons per minute. However, the best method of control is visual observation with the emulsifier deactivating solution being added in quantities sufficient to give a serum which is substantially clear, thereby indicating essentially complete coagulation of the latex. Since the serum is not recycled in the system, any quantity of a suitable substance which normally would be detrimental to the coagulation process may be added to the soap conversion tank 221, or at any point past coagulation tank 205.

A mixture comprising coagulum containing carbon black which may be uniformly dispersed therein and substantially clear serum overflow spout 227 onto de-watering screen 228. The serum is separated from the coagulum and passed downwardly into vessel 229, while the coagulum passes across screen 228 and spout 230 into wash tank 231. In accordance with conventional prior art practice, the serum which is withdrawn from vessel 229 via conduit 232 is recycled to coagulant supply tank 206 and concentrated acid added thereto for the purpose of adjusting the pH to a desired level. However, in accordance with the present invention, it is essential that serum not be recycled and thus it is usually discarded as waste. In any event, the serum must not be recycled back to coagulation tank 205 or to a point in the system ahead of coagulation tank 205, as a substantially reduced crumb size invariably results.

Water is added to wash tank 231 via conduit 240 at a rate controlled by valve 241 and the mixture of crumb and water agitated by agitation means including driven stirrer 242. Since an acid-free crumb is desired, preferably the coagulation should be effected at a pH not lower than about 3.0 so as to reduce the amount of free acid present in the filtered crumb. If so desired, a small amount of base may be added to the wash water for the purpose of neutralizing the free acid. The mixture of washed crumb and wash water overflows spout 243 and it is thus dewatered, dried and baled in accordance with prior art practice. The crumb size of rubbery polymer coagulum produced in accordance with the above described process is increased substantially over that obtained by prior art coagulation methods wherein a partial coagulation step, oil addition and further coagulation in the presence of the added oil is not practiced and problems arising from fines are eliminated.

In accordance with the present invention, the coagulant in tank 206 must not be serum which has been recycled from the dewatering apparatus to the coagulation tank 205 after addition of concentrated coagulant. For example, when the coagulant is dilute acid substantially free of recycled serum, it may be prepared by feeding fresh water into coagulant tank 206 via conduit 234 at a rate controlled by valve 235 while concentrated acid is fed thereto via conduit 236 at a rate controlled by valve 237. The relative feed rates of fresh water and concentrated acid may be controlled so as to provide a solution having the desired pH. When the coagulant is prepared in this manner, detrimental substances are not introduced into coagulation tank 205 along with the coagulant which would be true if serum were substituted for the fresh water feed.

When coagulating a carbex in accordance with the present invention, it is not necessary to cream the carbex prior to coagulation by addition of a creaming agent such as brine. It has been found that the carbon black slurry itself will perform this function. In addition, a creaming agent such as brine or other salts should not be added at any point in the system ahead of the coagulation tank since, in many instances, this tends to reduce the crumb size. Thus, for best results the carbex is coagulated in the presence of only the salts normally present in the latex carbon black slurry, oil emulsion and anti-oxidant emulsion.

In accordance with prior art practice, it is necessary to recycle serum in the system in order to provide sufficient liquid for an agitatable mass in each of the tanks following head tank 180, and also to provide sufficient liquid to physically transport the crumb from one tank to the next along the coagulation chain. However, in accordance with the present invention, the carbon black slurry which is fed to head tank 180 contains sufficient water when combined with the serum of the latex, to provide the necessary liquid to float the coagulum along through the vessels of the coagulation chain. It is not necessary to add a greater volume of coagulant to the coagulation tank than is necessary to effect coagulation. Preferably, however, the coagulant is relatively dilute in order to provide a sufficient volume to assure thorough mixing with the contents of the coagulation tank 205.

The carbex continuously overflowing spout 199 may be prepared by adding continuously to head tank 180 1–200 gallons per minute of a conventional 1–10% (by weight) high abrasion furnace black slurry in water, 1–100 gallons per minute of a 5–40% TSC (by weight) rubbery polymer latex such as butadiene-styrene latex prepared by a conventional "cold rubber" polymerization recipe and process, 0–20 gallons per minute of a 20–70% (by weight) conventional rubbery polymer processing oil emulsion, and 0.1–10 pounds per minute of a 5–25% (by weight) conventional rubbery polymer antioxidant emulsion such as "BLE" or phenyl-B-naphthylamine. "BLE" is a proprietary product that is said to be the high temperature reaction product of di-phenylamine and acetone. The resulting carbex may contain, for each 100 parts by weight of rubbery polymer, 1–105 parts by weight of carbon black, 0–105 parts by weight of processing oil and 0.5–3.5 parts by weight of anti-oxidant. The preferred composition for many purposes is 50 parts by weight of carbon black, 10 parts by weight of processing oil and 1.25 parts by weight of anti-oxidant for each 100 parts by weight of rubbery polymer.

The oil emulsion may be added to trough 203 in an amount of about 1–105 parts by weight of contained oil for each 100 parts by weight of polymer, with about 1–50 parts by weight of contained oil for each 100 parts by weight of polymer generally being preferred. Usually about 10 parts by weight of contained oil for each 100 parts by weight of polymer will give very good results from the standpoint of producing large crumb-size product. However, in instances where an oil-extended polymer is being prepared, more processing oil may be added to give the desired composition. If it is desired to prepare an oil-extended rubbery polymer product, then a portion of the oil should be fed to head tank 180 for best results and a second portion fed to partial coagulation trough 203. For example, it is usually preferred to feed 1–50 parts by weight of the oil to head tank 180 and 1–50 parts by weight to partial coagulation trough 203 for each 100 parts by weight of polymer. Generally, it is only necessary that the quantity of oil fed to partial coagulation trough 203 be sufficient to coat at least a major proportion of the rubbery polymer particles after breaking of the emulsion. When the coagulant is dilute mineral acid having pH of about 1.0–2.5, it may be added to trough 203 at the rate of 1–30 gallons per minute and to the coagulation tank 205 at the rate of 10–80 gallons per minute to provide the necessary pH limits.

It is sometimes desirable to prepare masterbatches containing at least 100 parts by weight, and preferably 100 to 150–200 parts by weight, of a pigmenting and/or reinforcing agent for each 100 parts by weight of the rubbery polymer. In such instances, it is necessary to prepare the masterbatch in accordance with the present invention as otherwise a sufficiently large crumb size cannot be produced and the resulting fine crumb causes the operating difficulties mentioned herein. The oil content of masterbatches containing the above mentioned high levels of pigmenting and/or reinforcing agent may be as stated herein for lower levels, but it may be higher and in some instances equal by weight to the pigmenting and/or reinforcing agent. Often about 60–80 parts by weight of oil for each 100 parts by weight of rubbery polymer are preferred.

While a continuous process has been described above, it is understood that the invention is not limited thereto. For example, the principles of the present invention also are applicable to batch-type operation. In addition, it may be possible to prepare masterbatches containing other pigments and/or reinforcing agents for rubbery polymers such as lignin, finely divided calcium silicate, clay, silica, etc. Also, where the coagulant is carbonic acid, it is possible to prepare masterbatches of finely divided zinc oxide, calcium carbonate, magnesium carbonate, etc. The pronounced tendency of such materials to cause an uneconomic proportion of fines when latex containing the same is coagulated in accordance with prior art methods may be substantially reduced when operating in accordance with the present invention. Emulsions of tackifying substances other than rubbery polymer processing oils may be added to partially coagulated latex, the emulsion broken, and the substance deposited on the particles of polymer, as distinguished from being distributed therethrough, in an amount which causes the small particles to tend to fuse and form larger particles during a subsequent further coagulation step. Examples of substances useful as tackifying agents in the form of aqueous emulsions are rosin oil, disproportionated rosin acids, rosin, liquid low molecular weight polybutadiene, antioxidants such as BLE or antioxidants such as N,N'-dioctyl paraphenylene diamine, pine tar oil, napththenic acid, and asphaltic materials such as "mineral rubber." In some instances, the tackifying substances need not be added in emulsion form since the rubbery polymer particles may be coated with the tackifying substance directly.

The addition of rubber processing oil emulsion or other suitable tackifying agent to partially coagulated latex containing a pigment and/or reinforcing agent is thought to result in the deposition of a film on the fine particles of coagulum which aids in the agglomeration of the fines into larger particles upon further coagulation of the latex. The resulting larger particles are characterized by a porous structure which dries more satisfactorily and at a faster rate without "case hardening" of the crumb. The preparation of an oil-batch masterbatch in accordance with the invention also results in a better quality, higher Mooney rubbery polymer product without the disadvantages of reduced processability. In addition, when processing the rubbery polymer product of the invention, it is possible to use shorter Banbury cycles and yet obtain equally good dispersion of both oil and carbon black. Thus, among other advantages the present invention reduces processing equipment requirements, increases the capacity of existing equipment, and decreases labor requirements.

The synthetic rubber latices which may be coagulated in accordance with the invention may be prepared by processes well known in the art such as, for example, prior art processes wherein a polymerizable monomeric material or a mixture of polymerizable materials is emulsified in an aqueous medium by means of an emulsifying agent such as a soap or other suitable surface active agent, and the polymerization made to take place at a controlled temperature in the presence of a suitable catalyst and/or other regulating materials. The primary emulsifier preferably should be unstable at low pH and may be a long chain fatty acid soap such as sodium or potassium oleate or stearate, the rosin soaps, or mixtures thereof. The polymerization is generally "short-stopped" at a suitable stage before complete conversion, such as at about 60% conversion, and the unreacted monomer or monomers removed by conventional flashing and/or stripping. As is well understood in the art, it is also advantageous in the preparation of certain synthetic rubber latices, such as SBR latices, to carry out the polymerization at a low temperature such as about 41° F. However, the polymerization may take place at a high temperature such as about 122° F. when preparing SBR latices by a prior art "hot rubber" process.

Examples of polymerizable materials for use in preparing the synthetic rubber latices are the various 1,3-butadienes such as 1,3-butadiene, methyl-2-butadiene-1,3, piperylene, and 2,3-dimethyl-butadiene-1,3. If desired, the polymerizable material may be a mixture of a 1,3-butadiene, such as 1,3-butadiene, with another polymerizable compound which is capable of forming rubbery copolymers with 1,3-butadienes. For example, such polymerizable mixtures may contain up to 50% (or higher in some instances) of a compound which contains a $CH_2=C=$ group wherein at least one of the disconnected valences is attached to an electro-active group, i.e., a group which substantially increases the electrical dissymmetry or polar character of the molecule. Examples of compounds containing the aforementioned group and copolymerizable with the 1,3-butadienes are the aryl olefins, such as styrene and vinyl naphthalene; the alpha methylene carboxylic acids, and their esters, nitriles and amides, such as acrylic acid, methyl acrylate, methyl methacrylate, acrylonitrile, methacrylonitrile and methacrylamide; isobutylene; methyl vinyl ether; and methyl vinyl ketone. The foregoing polymerizable substances or mixtures are examples of materials that may be used in preparing rubbery polymer latices for use in the present invention which may be referred to in the specification and claims as latices of homo-polymers of conjugated diolefins and copolymers of conjugated diolefins and ethylenically unsaturated monomers. The preferred polymerizable material is a mixture of butadiene and styrene wherein the styrene content of the mixture, by weight, is less than about 50%. A typical recipe in parts by weight, for preparing a butadiene-styrene synthetic rubber latex by a "cold rubber" process is given below in Table I.

TABLE I

| | |
|---|---|
| Butadiene | 100–50 |
| Styrene | 0–50 |
| Primary emulsifier [1] | 1.5–5.0 |

[1] The primary emulsifier may be a long chain fatty acid soap such as sodium or potassium oleate or stearate, the rosin soaps, or mixtures thereof.

TABLE I.—Continued

| | |
|---|---|
| Electrolyte [2] | 0.2–1.5 |
| Secondary emulsifier [3] | 0–0.12 |
| Ethylenediamine tetraacetic acid tetra sodium salt [4] (in soap solution) | 0–0.10 |
| Sodium hydrosulfite | 0–0.10 |
| Water | 150–250 |
| Sodium formaldehyde sulfoxylate | 0.04–0.20 |
| Diisopropylbenzene hydroperoxide or paramenthane hydroperoxide | 0.03–0.30 |
| Tertiarydodecylmercaptan | 0–0.3 |
| Ferrous sulfate heptahydrate | 0.02–0.04 |
| Versene 100 to complex ferrous sulfate | 0.03–0.06 |
| Shortshop [5] | 0.05–0.20 |

[2] The following electrolytes or mixtures may be used: Potassium chloride, sodium chloride, trisodium phosphate, tripotassium phosphate, potassium pyrophosphate, potassium sulfate, sodium sulfate, sodium borate and lithium chloride. The preferred electrolyte is 0.3 part by weight of trisodium phosphate.
[3] Tamol N, Daxad 11, Nycol (polymerized sodium salts of alkyl naphthalene sulfonic acid).
[4] Sold as Versene 100, a product of Dow Chemical Company; Sequestrene 30A, a product of Alrose Chemical Company; Nullapon BF-13, a product of Antara Chemicals.
[5] A 50/50 mixture of sodium dimethyl dithiocarbamate and sodium polysulfide.

The preparation of carbon black slurries is well known in the art. For example, pelletized high abrasion furnace black may be finely ground by a mechanical pulverizer such as a Mikro-Pulverizer and the dry carbon black dropped into an aqueous solution of a wetting agent or soap with agitation. The oil emulsion and the antioxidant emulsion may be prepared by any suitable process such as by violently agitating the oil or antioxidant in a blendor with an aqueous solution of a wetting agent or soap. Any suitable rubber processing oil may be used in preparing the oil emulsion. While numerous suitable rubbery processing oils are known to the art, several examples are described by Rostler et al., Industrial and Engineering Chemistry, vol. 41, No. 3 (March 1949), pages 598–608; and Weinstock et al., Industrial and Engineering Chemistry, vol. 45, No. 5 (May 1953), pages 1036–1053. Other suitable rubbery polymer processing oils are rubber processing oils of the paraffinic, aromatic, highly aromatic, napthenic, and highly naphthenic types. These oils are usually of petroleum origin.

The foregoing detailed description and the following specific example are for purposes of illustration only and are not intended as limiting to the spirit or scope of the appended claims.

Example I

Dry pelletized high abrasion furnace black was metered and fed continuously to a fluid energy pulverizer such as illustrated in FIGURE 4 at a rate of 30 pounds per minute. Superheated steam at 440° F. was passed to the fluid energy pulverizer for the purpose of supplying the fluid energy necessary for feeding and grinding the carbon black. The steam used in the injector jet feeding the carbon black into the fluid energy pulverizer was at a pressure of 125 p.s.i.g., while the steam tangentially supplied to the chamber was at a pressure of 50 p.s.i.g. The feed ratio by weight of steam to carbon black was about 1:1.

The resultant suspension of comminuted carbon black in steam withdrawn from the fluid energy pulverizer was fed continuously to a quench tower of the type illustrated in FIGURE 1-a. In the quench tower, the suspension of comminuted carbon black in steam was converted into a 6% carbon black slurry (by weight) by means of spray nozzles feeding about 56 gallons per minute of fresh water. The temperature of the resultant carbon black slurry was about 185° F. The pressure in the quench tower was about 1 p.s.i.g. The carbon black slurry collecting in the bottom of the quench tower was withdrawn at the rate of its formation, i.e., about 60 gallons per minute, by means of a pump.

The 6% (by weight) carbon black slurry was pumped continuously to a head tank at a rate of about 60 gallons per minute, while a 20% TSC (by weight) butadiene-styrene latex prepared by a conventional "cold rubber" process using the polymerization recipe of Table I was metered continuously into the head tank at a rate of 34.5 gallons per minute. In addition, 3.78 gallons per minute of a 55% (by weight) rubbery polymer processing oil emulsion was metered continuously into the head tank along with 4.8 pounds per minute of a 15% (by weight) BLE emulsion. The resulting contents of the head tank were approximately as follows, with all parts being by weight:

| | Parts |
|---|---|
| Butadiene-styrene rubbery polymer solids | 100 |
| Carbon black | 50 |
| Processing oil | 30 |
| BLE anti-oxidant | 1.25 |

The above ingredients were fed to the head tank continuously and the resulting carbex continuously overflowed into a partial coagulation trough where a fresh sulfuric acid solution free of serum having a pH of 1.7 and prepared by diluting commercial concentrated sulfuric acid (98%) with fresh water was added at the rate of 15 gallons per minute to partially coagulate the latex at about 150° F. The acid was added at a point in the coagulation trough which was immediately adjacent the overflow trough leading from the head tank. Rubber processing oil emulsion of the highly aromatic type was added to the partial coagulation trough at a point approximately halfway between the latex entry and exit spouts. About 1.26 gallons per minute or about 10 parts by weight of the rubbery polymer processing oil per 100 parts of polymer were added at this point. Thus, the total amount of oil was about 40 parts by weight for each 100 parts by weight of polymer.

Under the above described conditions, the latex was partially coagulated in the partial coagulation trough to yield sand-like particles of rubbery polymer in a grayish colored latex. The mixture overflowing from the partial coagulation trough had a pH of about 5.0. The resulting partially coagulated latex after addition of the processing oil was fed continuously to a coagulation tank where sufficient additional sulfuric acid solution was added to maintain a pH therein of about 3.0. The contents of the coagulation tank were continuously agitated and the remaining latex was coagulated at about 140° F.

The agitated mixture of polymer crumb and milky serum was overflowed from the coagulation tank into a soap conversion tank where 4 gallons per minute of 1% by weight diethylene triamine solution was added to clear the serum.

A mixture of the resulting crumb and clear serum was overflowed from the soap conversion tank onto a dewatering screen where the serum was separated from the large size crumb. The serum was discarded and the crumb passed to a wash tank where it was flooded with water and agitated for the purpose of dissolving out any residual acid or soluble salts. The agitated mixture of the washed crumb and wash water was overflowed from the wash tank to a filter of the rotary vacuum drum type where the large particle size coagulum was separated and the wash water discarded. The coagulum was then dried and baled following conventional plant practice.

The resulting coagulum was of a substantially larger particle size than could be produced following prior art procedures where partial coagulation, oil addition, and further coagulation was not practiced. The problem of fines was completely eliminated by the above process. In instances where the oil emulsion feed to the partial coagulation trough was omitted or where the oil emulsion was added to the latex without partial coagulation, i.e., to the head tank only, with all other steps in the process being the same, the resulting crumb was substantially reduced in size. When attempts were made to recycle serum back to the coagulation tank, after addition of concentrated sulfuric acid to adjust the pH to 1.7, undersized crumb or fines were formed and this resulted in loss of product through the de-watering screen and the screen for the Oliver filter. In addition, difficulty was experienced in the drying operation since some of the undersized material sifted through the perforated trays of the drier and caused a fire hazard, as well as requiring attention and cleaning from the drier.

It was not necessary to add a creaming agent such as brine ahead of the coagulation tank. In fact, when brine was added ahead of the coagulation tank to cream the latex, this practice resulted in the formation of a noticeably smaller crumb and was abandoned. Thus, for best results, salts such as brine (NaCl) solution should not be added ahead of the coagulation tank or to the coagulation tank.

The above described oil feed to the head tank was omitted and 1.26 gallons per minute of oil emulsion were fed to the partial coagulation trough. All other steps in the process were as described above. The resulting crumb exhibited a substantial increase in particle size over that obtainable when the oil feed to the partially coagulated latex was omitted.

The black masterbatch product was tested and found to contain extremely finely divided particles of carbon black uniformly distributed therethrough. The above-prepared product was compared with products of the same composition but prepared by conventional processes and found to have improved properties such as a uniform, fast cure rate, improved abrasion resistance and increased tensile strength. Also, the carbon black content of the black masterbatch of the invention varied only slightly from run to run and the wet coagulum was porous and easily dried in a minimum period of time without "case hardening." The process was also found to offer many additional advantages not possible heretofore. For example, after many months of operation, the area surrounding the carbon black grinding and quenching operation was extremely clean as compared with conventional operation. Thus, the normally high expense of upkeep surrounding such units was eliminated. Also, in changing the carbon black rubber polymer ratio, it was only necessary to change the feed rate of carbon black to the process while maintaining the latex feed rate constant. However, it would also be possible to maintain the carbon black feed rate constant and change the latex feed rate in order to achieve desired changes in the masterbatch composition. In addition, it was possible to continuously produce a black masterbatch of uniform composition without the necessity for constantly determining the solids content of the carbon black slurry and no difficulty with fines or undersized coagulum was experienced.

*Example II*

The procedure of Example I is followed with the exception that the mixture coagulated in the head tank contains 100 parts by weight of carbon black for each 100 parts of the rubbery polymer. The resulting rubber crumb may be processed easily in conventional equipment. The oil content could be easily increased up to 80 parts by weight and the carbon black up to 150 parts by weight for each 100 parts by weight of rubbery polymer without processing difficulties.

When the above runs containing 100–150 parts by weight of carbon black and 30–80 parts by weight of oil are coagulated using a coagulating agent containing serum, or a one-step coagulation procedure is followed by which the partial coagulation step with oil addition is not practiced, a crumb having optimum properties cannot be produced for processing in conventional equipment. Thus, it is apparent that when at least 100 parts by weight of carbon black for each 100 parts by weight of rubbery polymer are present, then the coagulation should proceed in accordance with the present invention, i.e., two-stage coagulation with oil addition between stages and use of fresh coagulant that is substantially free of serum. The resulting product has unusual and unexpected properties as the crumb is sufficiently strong and large in particle size to be handled in conventional equipment. The crumb does not fracture into smaller particles and retains its initial particle size.

What is claimed is:

1. A method of coagulating rubbery polymer latices comprising the steps of partially irreversibly coagulating an intimate mixture including rubbery polymer latex and carbon black slurry with fresh coagulant substantially free of recycled serum, the partially coagulated mixture containing visible particles of coagulum and about 5–80% by weight of the rubbery polymer orginally present in the latex being irreversibly coagulated, dispersing rubbery polymer processing oil in the partially coagulated mixture, and further coagulating the partially coagulated mixture with fresh coagulant substantially free of recycled serum in the presence of the rubbery polymer processing oil, the mixture of rubbery polymer latex and carbon black slurry containing 100–200 parts by weight of carbon black for each 100 parts by weight of rubbery polymer and the rubbery polymer latex being selected from the group consisting of latices of homopolymers of conjugated diolefins, latices of copolymers of conjugated diolefins and mono-ethylenically unsaturated monomers copolymerizable therewith and mixtures thereof.

2. The method of claim 1 wherein the rubbery polymer latex comprises a copolymer of butadiene and styrene.

3. The method of claim 2 wherein the coagulant comprises an aqueous solution of mineral acid and the mixture of rubbery polymer latex and carbon black slurry contains about 100–150 parts by weight of carbon black for each 100 parts by weight of rubbery polymer.

4. A method of coagulating rubbery polymer latices comprising the steps of partially irreversibly coagulating an intimate mixture including rubbery polymer latex, carbon black slurry and an emulsion of a rubbery polymer processing oil with fresh coagulant substantially free of recycled serum, the partially coagulated mixture containing visible particles of coagulum and about 5–80% by weight of the rubbery polymer originally present in the latex being irreversibly coagulated, adding an emulsion of rubbery polymer processing oil to the partially coagulated mixture, and further irreversibly coagulating the partially coagulated mixture with fresh coagulant substantially free of recycled serum in the presence of the added rubbery polymer processing oil, the mixture of rubbery polymer latex, carbon black slurry and emulsion of a rubbery polymer processing oil containing 100–200 parts by weight of carbon black for each 100 parts by weight of rubbery polymer and the rubbery polymer latex being selected from the group consisting of latices of homo-polymers of conjugated diolefins, latices of copolymers of conjugated diolefins and mono-ethylenically unsaturated monomers copolymerizable therewith and mixtures thereof.

5. The method of claim 4 wherein the rubbery polymer latex comprises a copolymer of butadiene and styrene.

6. The method of claim 5 wherein the mixture of rubbery polymer latex, carbon black slurry and oil emulsion contains about 100–150 parts by weight of carbon black and 60–80 parts by weight of oil for each 100 parts by weight of rubbery polymer.

7. A method of continuously coagulating rubbery polymer latices, comprising the steps of partially irreversibly coagulating an intimate mixture including rubbery polymer latex and carbon black slurry by addition of fresh acidic coagulant substantially free of recycled serum to provide a pH of about 4.0–6.5 and thereby irreversibly coagulate about 5–80% by weight of the rubbery polymer originally present in the latex, adding an emulsion of rubbery polymer processing oil to the partially coagulated latex in an amount to provide about 1–100 parts by weight of the oil for each 100 parts by weight of the rubbery polymer, and further irreversibly coagulating the partially coagulated latex with fresh acidic coagulant substantially free of recycled serum in the presence of the rubbery polymer processing oil, the mixture of rubbery polymer latex and carbon black containing 100–200 parts by weight of carbon black for each 100 parts by weight of rubbery polymer and being coagulated continuously in a continuous commercial scale operation and the rubbery polymer latex being a copolymer of butadiene and styrene.

8. The method of claim 7 wherein the coagulant consists essentially of aqueous sulfuric acid.

9. A method of continuously coagulating rubbery polymer latices comprising the steps of partially irreversibly coagulating an intimate mixture of rubbery polymer latex, carbon black slurry and an emulsion of a rubbery polymer processing oil by addition of fresh acidic coagulant substantially free of recycled serum to a continuously flowing stream of latex in an amount to provide a pH of about 4.0–6.5 and thereby irreversibly coagulate about 5–80% by weight of the rubbery polymer originally present in the mixture, the mixture containing about 1–50 parts by weight of the oil for each 100 parts by weight of the rubbery polymer, adding an emulsion of rubbery polymer processing oil to the partially coagulated latex in an amount to provide an additional 1–50 parts by weight of the oil for each 100 parts by weight of the rubbery polymer, and further irreversibly coagulating the partially coagulated latex by addition of fresh acidic coagulant substantially free of recycled serum to a continuously flowing stream of the partially coagulated latex in the presence of the added rubbery polymer processing oil, the mixture of rubbery polymer latex, carbon black slurry and emulsion of rubbery polymer processing oil containing 100–200 parts by weight of carbon black for each 100 parts by weight of rubbery polymer and being coagulated continuously in a continuous commercial scale operation and the rubbery polymer latex being a copolymer of butadiene and styrene.

10. The method of claim 9 wherein the coagulant consists essentially of aqueous sulfuric acid and the mixture of rubbery polymer latex, carbon black slurry and oil emulsion contains about 100–150 parts by weight of carbon black and not more than 80 parts by weight of the oil for each 100 parts by weight of rubbery polymer.

11. A method of coagulating rubbery polymer latices comprising the steps of dispersing material selected from the group consisting of pigmenting agents and reinforcing agents for rubbery polymers in rubbery polymer latex, the pigmenting agents and reinforcing agents for rubbery polymers being selected from the group consisting of carbon black, lignin, calcium silicate, clay, silica, zinc oxide, calcium carbonate and magnesium carbonate, partially irreversibly coagulating the latex containing the dispersed material with fresh coagulant substantially free of recycled serum, the partially coagulated latex containing visible particles of coagulum and about 5–80% by weight of the rubbery polymer originally present in the latex being irreversibly coagulated, the mixture of rubbery polymer latex and dispersed material containing 100–200 parts by weight of the dispersed material for each 100 parts by weight of rubbery polymer, dispersing a tackifying agent in the partially coagulated latex selected from the group consisting of rubbery polymer processing oil, rosin oil, disproportionated rosin acids, rosin, liquid low molecular weight polybutadiene, N,N'-dioctylparaphenylene diamine, the reaction product at elevated temperature of diphenylamine and acetone, pine tar oil, naphthenic acid and mineral rubber and further irreversibly coagulating the latex with fresh coagulant substantially free of recycled serum, the rubbery polymer latex being selected from the group consisting of latices of homopolymers of conjugated diolefins, latices of copolymers of conjugated diolefins and mono-ethylenically unsaturated monomers copolymerizaable therewith and mixtures thereof.

12. The method of claim 11 wherein the rubbery polymer latex comprises a copolymer of butadiene and styrene.

13. The method of claim 12 wherein the coagulant comprises an aqueous solution of mineral acid.

14. A method of preparing a dispersion of carbon black in solid rubbery polymer from dry pelletized carbon black and rubbery polymer latex comprising the steps of comminuting pelletized carbon black by grinding in the dry state, suspending carbon black in a gaseous medium comprising steam, intimately contacting the gaseous suspension of comminuted carbon black with an aqueous medium to condense steam and produce a suspension of carbon black in the aqueous medium, mixing the suspension of carbon black in aqueous medium with rubbery polymer latex to produce a mixture, partially irreversibly coagulating the mixture with fresh coagulant substantially free of recycled serum, the partially coagulated mixture containing visible particles of coagulum and about 5–80% by weight of the rubbery polymer originally present in the latex being irreversibly coagulated, dispersing a tackifying agent in the partially coagulated mixture selected from the group consisting of rubbery polymer processing oil, rosin oil, disproportionated rosin acids, rosin, liquid low molecular weight polybutadiene, N,N'-dioctylparaphenylene diamine, the reaction product at elevated temperature of diphenylamine and acetone, pine tar oil, naphthenic acid and mineral rubber, and further irreversibly coagulating the partially coagulated latex with fresh coagulant substantially free of recycled serum, the mixture of rubbery polymer latex and carbon black suspension containing 100–200 parts by weight of carbon black for each 100 parts by weight of rubbery polymer and the rubbery polymer latex being selected from the group consisting of latices of homopolymers of conjugated diolefins, latices of copolymers of conjugated diolefins and mono-ethylenically unsaturated monomers copolymerizable therewith, and mixtures thereof.

15. The method of claim 14 wherein the rubbery polymer latex comprises a copolymer of butadiene and styrene.

16. The method of claim 15 wherein the coagulant comprises an aqueous solution of mineral acid.

17. A continuous method of preparing a dispersion of carbon black in solid rubbery polymer from dry pelletized carbon black and rubbery polymer latex comprising the steps of comminuting pelletized carbon black by grinding in the dry state, suspending carbon black in a gaseous medium comprising steam, intimately contacting the gaseous suspension of comminuted carbon black with an aqueous medium to condense steam and produce a suspension of carbon black in the aqueous medium, continuously mixing the suspension of carbon black in aqueous medium with rubbery polymer latex to produce a mixture, partially irreversibly coagulating the mixture by addition of fresh coagulant substantially free of recycled serum to a continuously flowing stream of the mixture, the partially coagulated mixture containing visible particles of coagulum and about 5–80% by weight of the rubbery polymer originally present in the latex being irreversibly coagulated, dispersing rubbery polymer processing oil in the partially coagulated latex and further irreversibly coagulating the partially coagulated latex by addition of fresh coagulant substantially free of recycled serum to a continuously flowing stream of the partially coagulated mixture in the presence of rubbery polymer processing oil, the mixture including rubbery polymer latex and carbon black suspension containing 100–200 parts by weight of carbon black for each 100 parts by weight of rubbery polymer and being coagulated continuously in a continuous commercial scale operation and the rubbery polymer latex being selected from the group consisting of latices of homopolymers of conjugated diolefins, latices of copolymers of conjugated diolefins and mono-ethylenically unsaturated monomers copolymerizable therewith and mixtures thereof.

18. The method of claim 17 wherein the rubbery polymer latex is a copolymer of butadiene and styrene.

19. The method of claim 18 wherein the coagulant consists essentially of an aqueous solution of sulfuric acid in fresh water.

References Cited by the Examiner
UNITED STATES PATENTS

| | | | |
|---|---|---|---|
| 3,048,559 | 8/1962 | Heller et al. | 260—1.5 |
| 3,079,360 | 2/1963 | Sutherland et al. | 60—759 |
| 3,092,603 | 6/1963 | Gauslaa et al. | 60—759 |

OTHER REFERENCES

Brady, G. L. Mandelcorn, and C. A. Winkler, Canadian Journal of Chemistry, vol. 31, Number 1, January 1953, pp. 55–58.

MORRIS LIEBMAN, *Primary Examiner.*

ALLAN LIEBERMAN, *Examiner.*

J. W. BEHRINGER, J. E. CALLAGHAN,
*Assistant Examiners.*